US012300092B2

(12) United States Patent
Scalisi

(10) Patent No.: US 12,300,092 B2
(45) Date of Patent: *May 13, 2025

(54) DOORBELL COMMUNICATION SYSTEMS AND METHODS

(71) Applicant: SKYBELL TECHNOLOGIES IP, LLC, Irvine, CA (US)

(72) Inventor: Joseph Frank Scalisi, Yorba Linda, CA (US)

(73) Assignee: SKYBELL TECHNOLOGIES IP, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,380

(22) Filed: Dec. 4, 2023

(65) Prior Publication Data

US 2024/0105033 A1    Mar. 28, 2024

Related U.S. Application Data

(63) Continuation of application No. 17/356,213, filed on Jun. 23, 2021, now Pat. No. 11,854,376, which is a continuation of application No. 17/001,676, filed on Aug. 24, 2020, now Pat. No. 11,074,790.

(60) Provisional application No. 62/891,344, filed on Aug. 24, 2019.

(51) Int. Cl.
| G08B 5/22 | (2006.01) |
| G08B 5/36 | (2006.01) |
| H04N 9/31 | (2006.01) |
| H04N 23/54 | (2023.01) |
| H04N 23/56 | (2023.01) |

(52) U.S. Cl.
CPC ............ *G08B 5/222* (2013.01); *G08B 5/36* (2013.01); *H04N 9/3194* (2013.01); *H04N 23/54* (2023.01); *H04N 23/56* (2023.01)

(58) Field of Classification Search
CPC .......... G08B 5/222; G08B 5/36; H04N 23/56; H04N 23/51; H04N 23/57
See application file for complete search history.

(56) References Cited

U.S. PATENT DOCUMENTS

| 6,697,636 | B1 | 2/2004 | Hutchinson | |
| 9,858,770 | B2* | 1/2018 | Glencross | G03B 29/00 |
| 10,769,906 | B2* | 9/2020 | Jeon | G08B 13/19656 |
| 10,796,568 | B2* | 10/2020 | Siminoff | G08B 15/00 |
| 11,074,790 | B2 | 7/2021 | Scalisi | |

(Continued)

FOREIGN PATENT DOCUMENTS

| CN | 2304927 Y | 1/1999 |
| JP | 2021179576 A | 11/2021 |
| KR | 200161878 Y1 | 12/1999 |

*Primary Examiner* — John A Tweel, Jr.
(74) *Attorney, Agent, or Firm* — Gallium Law; Wesley Schwie; Jacob Panangat

(57) ABSTRACT

A doorbell system may project an illumination on a surface. The doorbell may include a housing, a button, a camera, a microphone, a speaker, a motion detector, and a light source. In some embodiments, the doorbell includes at least one lens coupled to a bottom surface of the housing adjacent the light source. The at least one lens may be configured to allow light from the light source to pass through the at least one lens such that when the electronic doorbell is attached to a building the light source projects an illumination onto a ground surface in front of the doorbell.

20 Claims, 12 Drawing Sheets

(56) References Cited

U.S. PATENT DOCUMENTS

| | | |
|---|---|---|
| 11,854,376 B2 | 12/2023 | Scalisi |
| 2004/0257670 A1 | 12/2004 | Kawakami |
| 2015/0156031 A1 | 6/2015 | Fadell |
| 2016/0314663 A1 | 10/2016 | Glencross |
| 2018/0032979 A1 | 2/2018 | Siminoff |
| 2019/0066471 A1 | 2/2019 | Jeon |
| 2019/0206243 A1 | 7/2019 | Siminoff |
| 2019/0327449 A1 | 10/2019 | Fu et al. |
| 2021/0319674 A1 | 10/2021 | Scalisi |
| 2024/0105033 A1 | 3/2024 | Scalisi |

\* cited by examiner

DOORBELL COMMUNICATION SYSTEMS AND METHODS

CROSS-REFERENCE TO RELATED APPLICATIONS

The entire contents of the following application are incorporated by reference herein: NonProvisional patent application Ser. No. 17/356,213; filed Jun. 23, 2021; entitled DOORBELL COMMUNICATION SYSTEMS AND METHODS.

The entire contents of the following application are incorporated by reference herein: U.S. Nonprovisional patent application Ser. No. 17/001,676; filed Aug. 24, 2020; issued as U.S. Pat. No. 11,074,790 on Jul. 27, 2021; entitled DOORBELL COMMUNICATION SYSTEMS AND METHODS.

The entire contents of the following application are incorporated by reference herein: U.S. Provisional Patent Application No. 62/891,344; filed Aug. 24, 2019; entitled DOORBELL COMMUNICATION SYSTEMS AND METHODS.

BACKGROUND

Field

Various embodiments disclosed herein relate to doorbells. Certain embodiments relate to doorbells including a light.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

SUMMARY

In some embodiments, a doorbell system comprises an electronic doorbell, a visitor detection system coupled to the electronic doorbell, wherein the visitor detection system comprises at least one of a button, a camera, a microphone, and a motion detector, and a light communicatively coupled to at least one of the electronic doorbell and the visitor detection system, wherein the light is configured to project an illumination on a surface. When the electronic doorbell is attached to a building, the surface may comprise at least one of a floor, a ceiling, and at least one wall located adjacent to the electronic doorbell. In some embodiments, the light is configured to constantly project the illumination.

Alternatively, the light may be configured to project the illumination in response to at least one of a press of the button, an indication of a presence of a visitor by the camera, a detection of sound by the microphone, and a detection of motion by the motion detector. In some embodiments, the system further comprises a remote computing device communicatively coupled to the doorbell system, wherein the remote computing device is configured to run a mobile application. The light may be configured to project the illumination in response to activation of the mobile application.

In some embodiments, the system further comprises a lens coupled to a housing of the electronic doorbell and positioned such that the illumination is emitted through the lens and onto the surface. The lens may be detachably coupled to the housing. The system may further comprise at least one mechanical attachment threadably coupled to the housing, wherein the lens is adjustable in a first direction in response to rotating the at least one mechanical attachment in a first rotational direction and the lens is adjustable in a second direction in response to rotating the at least one mechanical attachment in a second rotational direction that is opposite the first rotational direction. In some embodiments, at least one of the lens and the light are detachably coupled to a bottom surface of the housing. Alternatively, at least one of the lens and the light may be detachably coupled to a top surface of the housing. Further, at least one of the lens and the light may be detachably coupled to at least one side surface of the housing.

A method of projecting an illumination by a doorbell system comprising an electronic doorbell, a visitor detection system coupled to the electronic doorbell wherein the visitor detection system comprises at least one of a button, a camera, a microphone, and a motion detector, and a light communicatively coupled to at least one of the electronic doorbell and the visitor detection system wherein the light is configured to project the illumination on a surface may comprise receiving, by the visitor detection system, a notification of a trigger event and in response to the receiving, projecting, by the light, the illumination on the surface.

In some embodiments, the trigger event comprises at least one of a press of the button, an indication recorded by the camera, a sound detected by the microphone, and a motion detected by the motion detector. Alternatively, the illumination may be projected in response to activation of a mobile application configured to run on a remote computing device. When the electronic doorbell is attached to a building, the illumination may be projected onto at least one of a floor, a ceiling, and at least one wall located adjacent to the electronic doorbell.

The method may further comprise emitting, by the light, the illumination through a lens and onto the surface, such that a design of the illumination is determined by the lens. In some embodiments, the design of the illumination comprises at least one of a message, a logo, and at least one color. The method may further comprise detachably coupling the lens to a housing of the electronic doorbell. In some embodiments, the method further comprises detachably coupling at least one of the lens and the light to a bottom surface of the housing. Alternatively, the method may comprise detachably coupling at least one of the lens and the light to a top surface of the housing. Further, in some embodiments, the method comprises detachably coupling at least one of the lens and the light to at least one side surface of the housing.

The method may further comprise threadably coupling at least one mechanical attachment to the housing. In some embodiments, the method further comprises rotating the at least one mechanical attachment in a first rotational direction. In response to rotating the at least one mechanical attachment in the first rotational direction, adjusting a lens may occur. In some embodiments, adjusting the lens comprises at least one of a movement in a left direction, a movement in a right direction, a movement in an upward direction, and a movement in a downward direction, zooming the lens inward, and zooming the lens outward.

The method may further comprise rotating the at least one mechanical attachment in a second rotational direction. In response to rotating the at least one mechanical attachment in the second rotational direction, adjusting a lens may occur. In some embodiments, adjusting the lens comprises at least one of a movement in a left direction, a movement in a right direction, a movement in an upward direction, a movement in a downward direction, zooming the lens inward, and zooming the lens outward.

In some embodiments, the trigger event comprises at least one of powering on the electronic doorbell and providing power to the electronic doorbell.

The disclosure also includes an electronic doorbell, comprising a housing, a button coupled to the housing, a camera coupled to the housing, a microphone coupled to the housing, a speaker coupled to the housing, a motion detector coupled to the housing, a light source coupled to the housing, and at least one lens coupled to a bottom surface of the housing adjacent the light source, wherein the at least one lens is configured to allow light from the light source to pass through the at least one lens such that when the electronic doorbell is attached to a building the light source projects an illumination onto a ground surface in front of the electronic doorbell.

In some embodiments, the doorbell includes a film coupled to the housing adjacent the at least one lens whereby the film comprises a light filter corresponding to the illumination.

The at least one lens may comprise at least one magnification lens configured to magnify the light from the light source. The at least one magnification lens may comprise a first magnification lens, a second magnification lens, and a third magnification lens.

In some embodiment, the least one lens comprises at least one focus lens configured to spread the light and focus the illumination onto the ground surface. In some embodiments, the light source is configured to constantly project the illumination. In some embodiments, the light source is configured to project the illumination in response to a press of the button. In some embodiments, the light source is configured to project the illumination in response to an indication of a presence of a visitor by the camera. In some embodiments, the light source is configured to project the illumination in response to a detection of a sound by the microphone. In some embodiments, the light source is configured to project the illumination in response to a detection of a motion by the motion detector.

In some embodiments, the electronic doorbell further comprises a remote computing device communicatively coupled to the electronic doorbell, wherein the remote computing device is configured to run a mobile application, wherein the electronic doorbell is configured to project the illumination in response to an input on the mobile application.

In some embodiments, the at least one lens is detachably coupled to the housing.

In some embodiments, the electronic doorbell further comprises at least one mechanical adjustment mechanism threadably coupled to the housing, wherein the at least one lens is adjustable in a first direction in response to rotating the at least one mechanical adjustment mechanism in a first rotational direction and the lens is adjustable in a second direction in response to rotating the at least one mechanical adjustment mechanism in a second rotational direction that is opposite the first rotational direction.

The disclosure also include a method of projecting an illumination by a doorbell electronic doorbell comprising an electronic doorbell, a visitor detection electronic doorbell coupled to the electronic doorbell wherein the visitor detection electronic doorbell comprises at least one of a button, a camera, a microphone, and a motion detector, and a light communicatively coupled to at least one of the electronic doorbell and the visitor detection electronic doorbell wherein the light is configured to project the illumination on a surface. In some embodiments, the method comprises receiving, by the doorbell electronic doorbell, a notification of a trigger event; and in response to the receiving, projecting, by the light, the illumination on the surface.

In some embodiments, the trigger event comprises at least one of a press of the button, an indication recorded by the camera, a sound detected by the microphone, and a motion detected by the motion detector.

In some embodiments, the method comprises emitting, by the light, the illumination through a lens and onto the surface, such that a design of the illumination is determined by the lens.

In some embodiments, the method comprises detachably coupling the lens to a housing of the electronic doorbell.

In some embodiments, the method comprises threadably coupling at least one mechanical adjustment mechanism to a housing of the electronic doorbell.

In some embodiments, the method comprises rotating the at least one mechanical adjustment mechanism in a first rotational direction, and in response to the rotating, adjusting a lens coupled to a housing of the electronic doorbell, the lens positioned such that the illumination is emitted through the lens and onto the surface whereby a design of the illumination is determined by the lens.

In some embodiments, the trigger event comprises at least one of powering on the electronic doorbell and providing power to the electronic doorbell.

The disclosure also include a doorbell system, comprising: an electronic doorbell; a visitor detection system coupled to the electronic doorbell, wherein the visitor detection system comprises at least one of a button, a camera, a microphone, a speaker, and a motion detector; and a light communicatively coupled to at least one of the electronic doorbell and the visitor detection system, wherein the light is configured to project an illumination on a surface.

In some embodiments, when the electronic doorbell is attached to a building the surface comprises at least one of a floor, a ground surface, and a wall located adjacent to the electronic doorbell.

In some embodiments, the light is configured to project the illumination in response to at least one of a press of the button, an indication of a presence of a visitor by the camera, a detection of sound by the microphone, and a detection of motion by the motion detector.

In some embodiments, the light is electrically and mechanically coupled to a printed circuit board located within a housing of the electronic doorbell.

In some embodiments, the system further comprises a remote computing device communicatively coupled to the doorbell system. The remote computing device may be configured to run a mobile application to thereby communicate with the doorbell system.

In some embodiments, the light is configured to project the illumination in response to activation of the mobile application.

In some embodiments, the system further comprises at least one lens detachably coupled to a housing of the electronic doorbell and arranged such that the illumination is emitted through the at least one lens and onto the surface. In some embodiments, the at least one lens is detachably coupled to the housing.

In some embodiments, the system further comprises a canister detachably coupled to a housing of the electronic doorbell; and at least one lens coupled to the canister whereby the at least one lens is substantially enclosed within the canister, wherein the at least one lens is arranged such that the illumination is emitted through the at least one lens and onto the surface. In some embodiments, the canister is configured to threadably couple to the housing.

In some embodiments, the at least one lens comprises at least one magnification lens and at least one focus lens, the system further comprising at least one film coupled to the canister whereby the at least one film is substantially enclosed in the canister, wherein the at least one film includes a design indicative of the illumination.

In some embodiments, the at least one magnification lens comprises three magnification lenses. In some embodiments, the at least one focus lens is located closer to the light source than the at least one magnification lens. In some embodiments, the at least one focus lens is located further from the light source than the at least one magnification lens.

In some embodiments, the at least one film is located between the at least one magnification lens and the at least one focus lens within the canister.

In some embodiments, the canister further comprises a protrusion extending from an outer surface of the canister, wherein the housing comprises a receiving channel configured to slideably receive the protrusion in order to achieve a desired orientation of the canister and the illumination.

In some embodiments, the system includes at least one mechanical adjustment mechanism threadably coupled to the housing, wherein the at least one lens is adjustable in a first direction in response to rotating the at least one mechanical adjustment mechanism in a first rotational direction and the at least one lens is adjustable in a second direction in response to rotating the at least one mechanical adjustment mechanism in a second rotational direction that is opposite the first rotational direction.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Component Index

Figure 1:
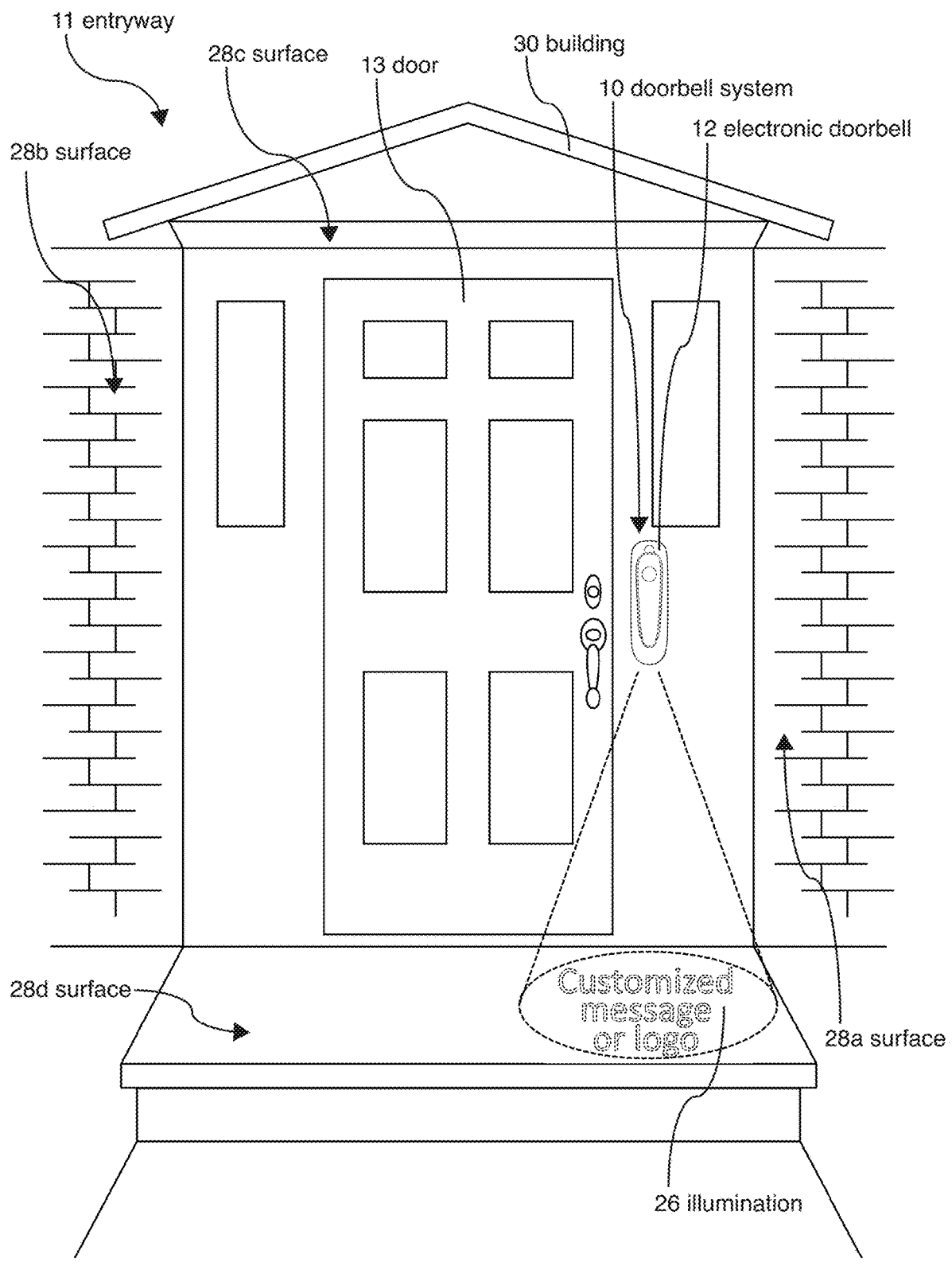
FIG. 1 illustrates a front view of a doorbell system coupled to a building, according to some embodiments.

- 10—doorbell system
- 11—entryway
- 12—electronic doorbell
- 13—door
- 14—visitor detection system
- 16—button
- 18—camera
- 19—speaker
- 20—microphone
- 22—motion detector
- 24—light
- 26—illumination
- 28—surface
- 30—building
- 32—floor/ground
- 34—removal device
- 38—remote computing device
- 40—mobile application
- 41—barrel assembly
- 42—at least one magnification lens
- 43—at least one focus lens
- 44—housing
- 46—at least one mechanical adjustment mechanism
- 56—bottom surface
- 60—at least one side surface
- 62—printed circuit board
- 64—canister
- 65—film holder
- 66—locking device FIG. 1 includes a front view of an entryway 11 to a building 30, including a door 13 that opens to reveal a walkway inside the building 30. FIG. 1 shows a front view of a doorbell system 10 including an electronic doorbell 12 (hereinafter "doorbell") configured to project an illumination 26 onto a surface 28. While not shown in FIG. 1, the doorbell 12 also includes a light 24 configured to project the illumination 26 onto surface 28. The doorbell 12 may be configured to project the illumination 26 onto the surface 28d directly in front of the doorbell 12, to either side on the ground surface 28d in front of the doorbell 12, and any other location viewable by a visitor. In some embodiments, the doorbell 12 is configured to project the illumination 26 onto any surface adjacent the entryway 11, such as surface 28a, 28b, 28c, 28d, and 28e. As shown in FIG. 1, the doorbell 12 is attached to the building 30 and located on a side surface 28a of the door 13. In some embodiments, the doorbell 12 is attached to any surface 28 on or adjacent the entryway, such as either surface 28a, 28b located on the side of the door 13, surface 28c located above the door 13, on the door 13 itself, surface 28d located on the ground in front of the door 13, and any other surface on the building 30.

In some embodiments, the doorbell 12 is configured to constantly (always) project the illumination 26. In some embodiments, the illumination 26 may be projected in response to a trigger, such as the press of a doorbell button 16, detection of sound by a microphone 20 of the visitor detection system 14, detection of motion by a motion detector 22 of the visitor detection system 14, detecting any indication of a presence of a visitor by the doorbell 12, powering on the electronic doorbell, providing power to the electronic doorbell, and the like. The illumination 26 may also be activated in response to a camera 18 of the visitor detection system 14 detecting an indication of a presence of a visitor.

Figure 2:
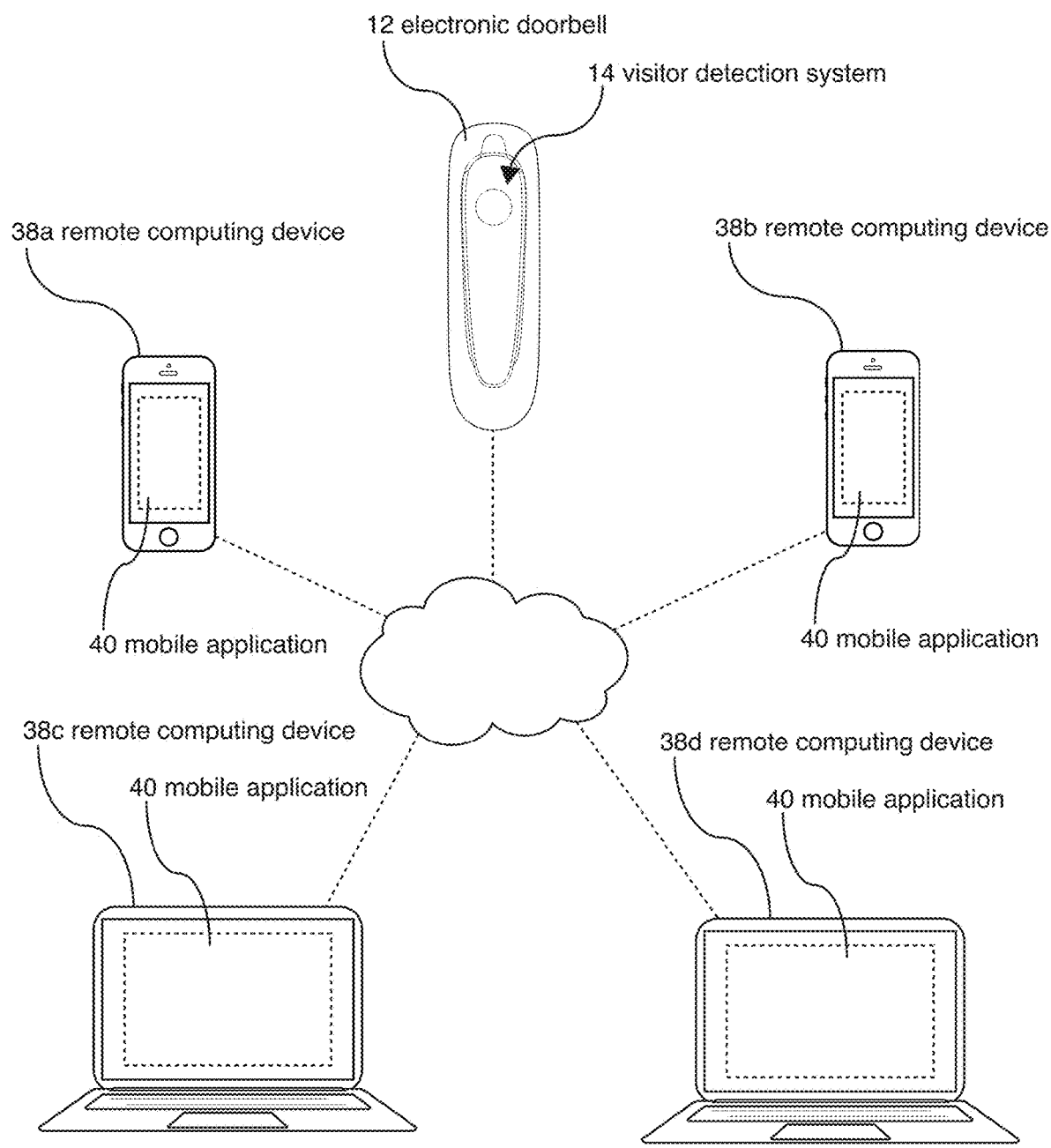
FIG. 2 illustrates an electronic doorbell communicatively coupled to a remote computing device, according to some embodiments.

FIG. 2 illustrates a doorbell 12 communicatively coupled to a remote computing device 38, such as a smart phone, tablet, laptop computer, desktop computer, wearable device, and the like. In some embodiments, the remote computing 38 allows a user to activate the light 24 located within the doorbell 12 to project the illumination 26 onto the surface 28. In some embodiments, the light 24 may be activated by any such trigger described above and including, but not limited to: waking up the remote computing device 38, activating the mobile application 40, a predetermined time of day occurring, a predetermined event occurring, and the like. It should be appreciated that any function performed on or by the remote computing device 38 or anything detected by the doorbell 12 may trigger the doorbell 12 to project the illumination 26 from the light 24 onto the surface 28.

Figure 3:
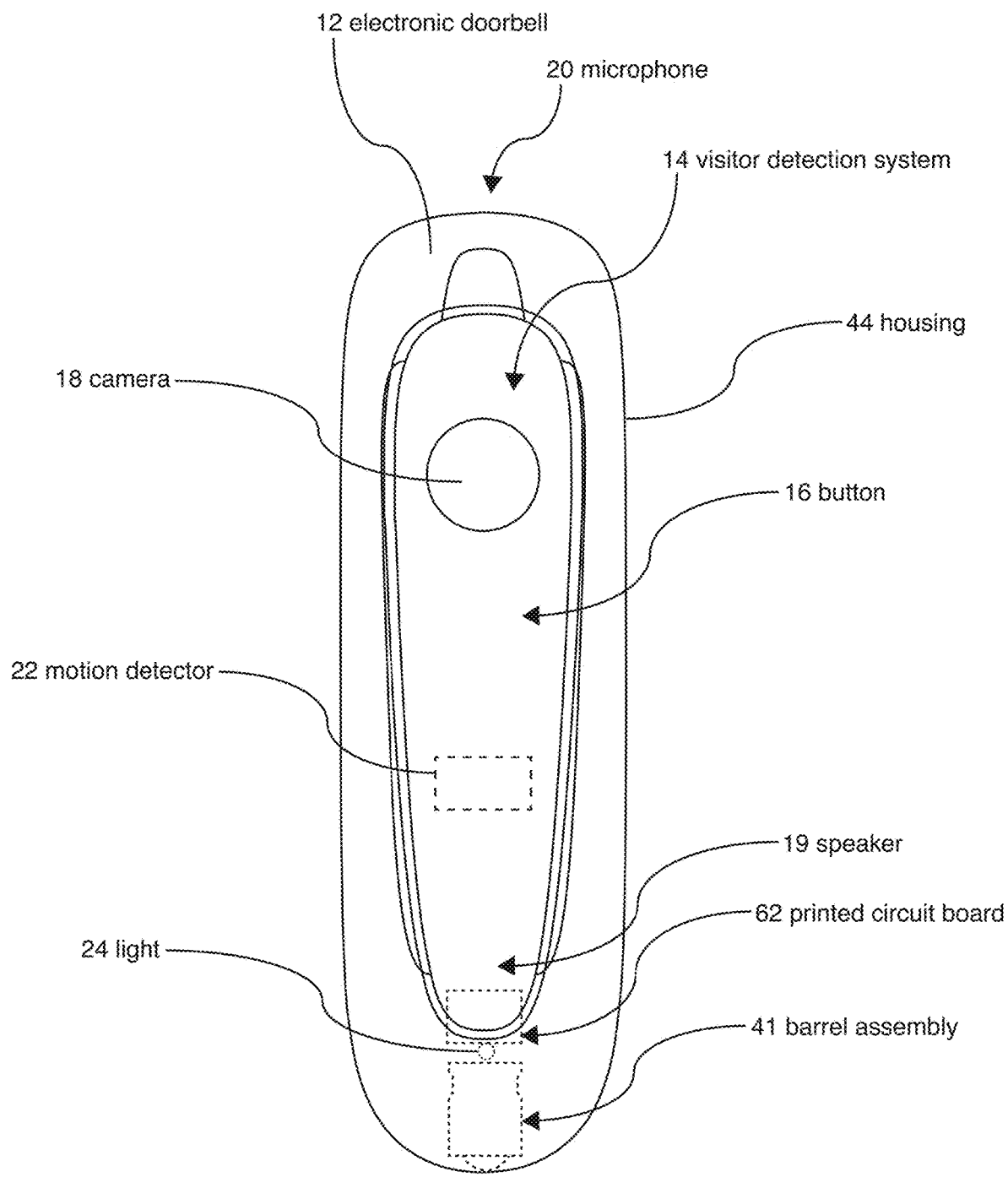
FIG. 3 illustrates a front view of an electronic doorbell showing the various components, according to some embodiments.
Figure 4:
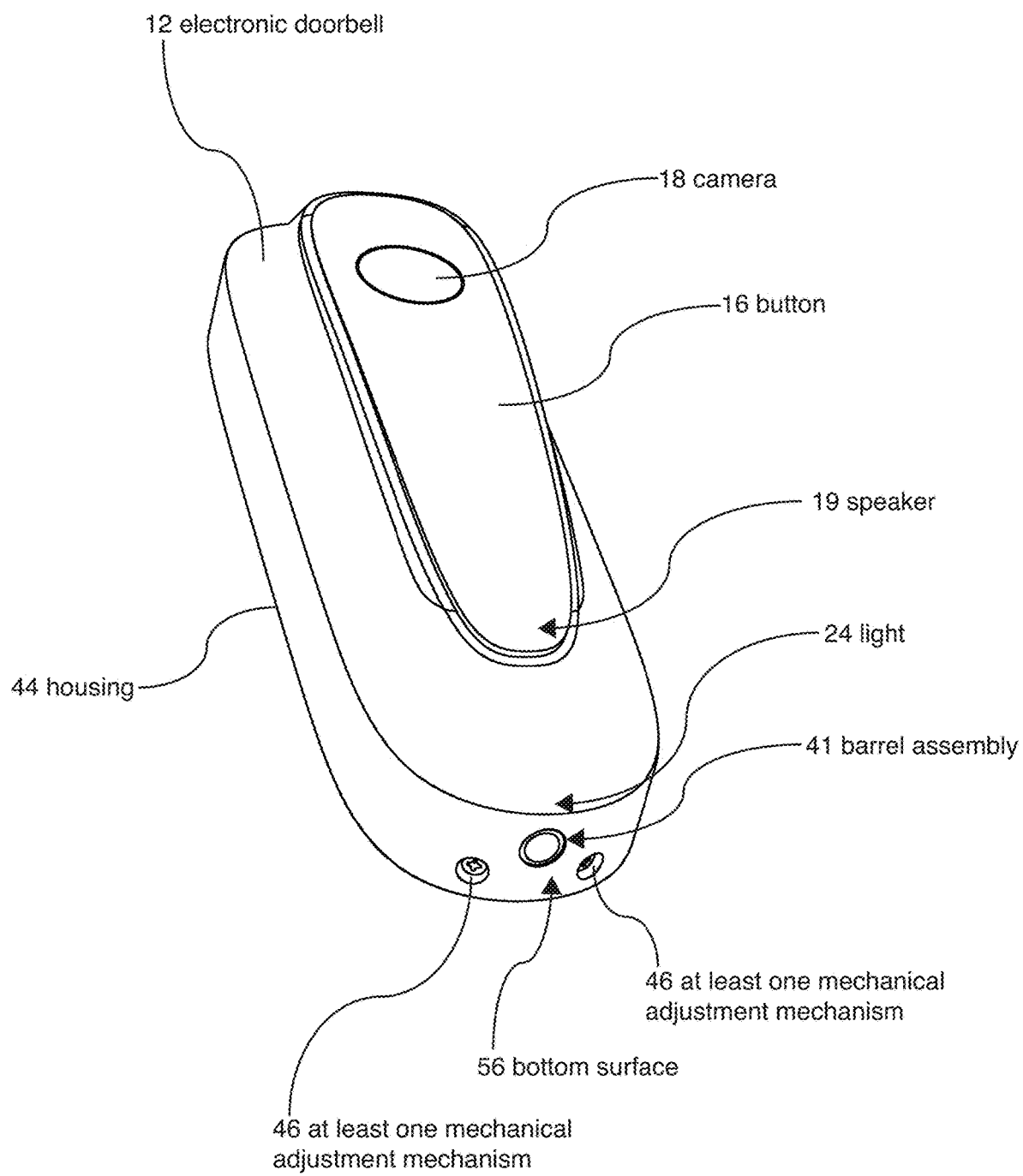
FIG. 4 illustrates a bottom perspective view of an electronic doorbell showing the various components, according to some embodiments.

As shown in FIGS. 3 and 4, the doorbell 12 may include a housing 44, a visitor detection system 14, a button 16, a camera 18, a speaker 19, a microphone 20, a motion detector 22, and at least one mechanical adjustment mechanism 46. In some embodiments, rotation of the at least one mechanical adjustment mechanism 46 may be allow a user to adjust the focus, intensity, and/or location of the illumination 26. Even still, in some embodiments, by rotating the at least one mechanical adjustment mechanism 46 this may allow the user to remove the housing 44. In some embodiments, when the at least one mechanical adjustment mechanism 46 is rotated in a first rotational direction, such as clockwise or counterclockwise, in response the barrel assembly 41 may move in a first direction. The first direction may comprise movement in a left direction, a right direction, an upward direction, a downward direction, zooming the lens inward, zooming the lens outward, and the like. Additionally, when the at least one mechanical adjustment mechanism 46 is rotated in the second rotational direction that is opposite the first rotational direction, in response the barrel assembly 41 may according move in a second direction. The second direction may comprise movement in a left direction, a right direction, an upward direction, a downward direction, zooming the lens inward, zooming the lens outward, and the like. Generally, the first direction and second direction may comprise up, down, left, right, zoom, focus, intensity, or any other suitable adjustment.

Figure 5:
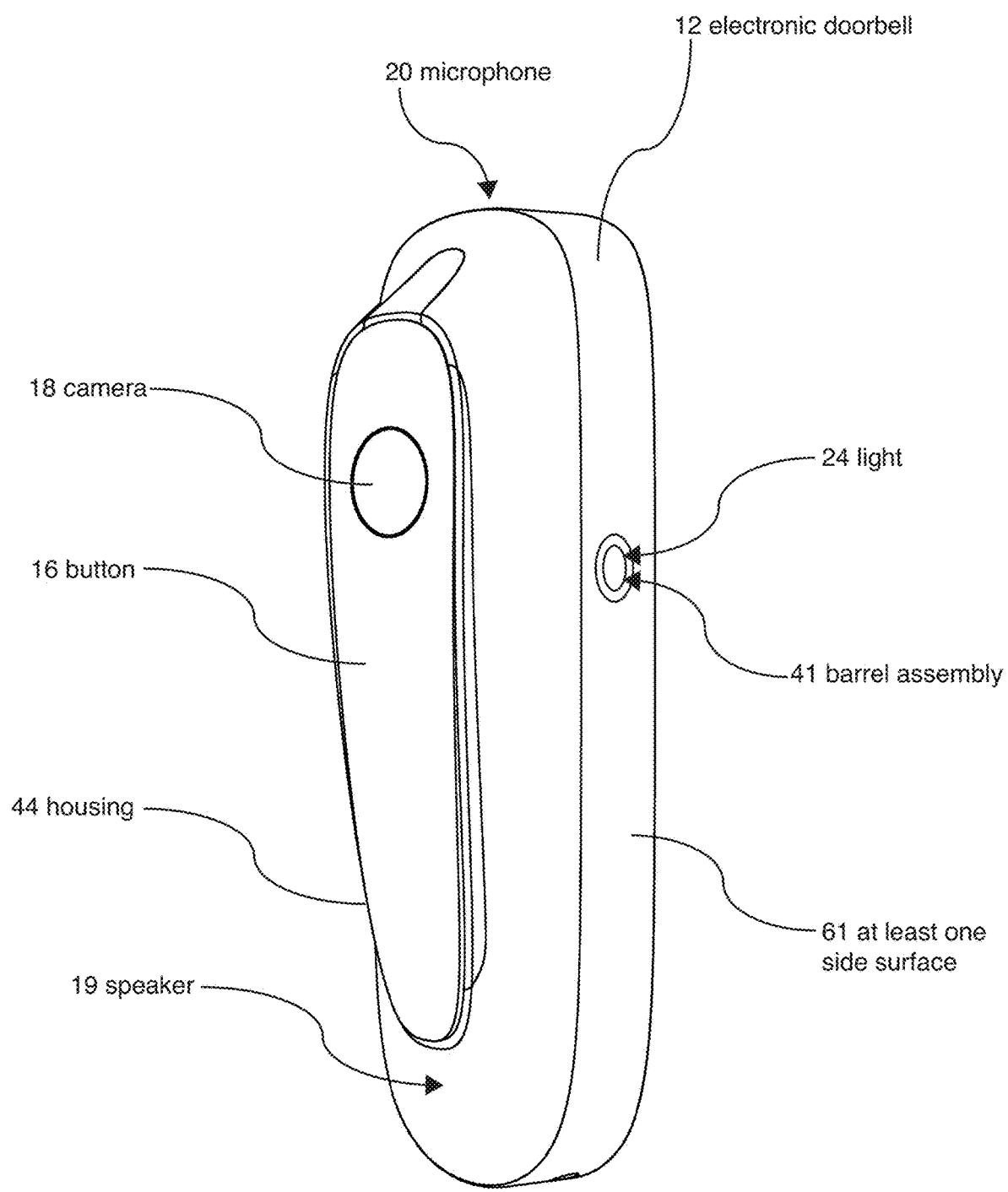
FIG. 5 illustrates a side perspective view of an electronic doorbell showing the various components, according to some embodiments.

With continued reference to FIGS. 3 and 4, the doorbell 12 may include a printed circuit board 62, a light 24 (such as a white light emitting diode "LED"), and a barrel assembly 41 coupled to a bottom surface 56 of the housing 44 in order to project the illumination 26 downward. As shown in FIG. 5, in some embodiments, the light 24 and barrel assembly 41 are coupled to at least one side surface 60 of the housing 44. Furthermore, in some embodiments, the light 24 and barrel assembly 41 may be coupled to a top surface of the housing 44. In such embodiments, the illumination 26 may be projected to the side of the doorbell 12, downward below the doorbell 12, or upward above the doorbell 12. For example, the illumination 26 may be projected onto at least one surface 28a, 28b, 28c, and 28d located adjacent the doorbell 12.

Figure 6A:
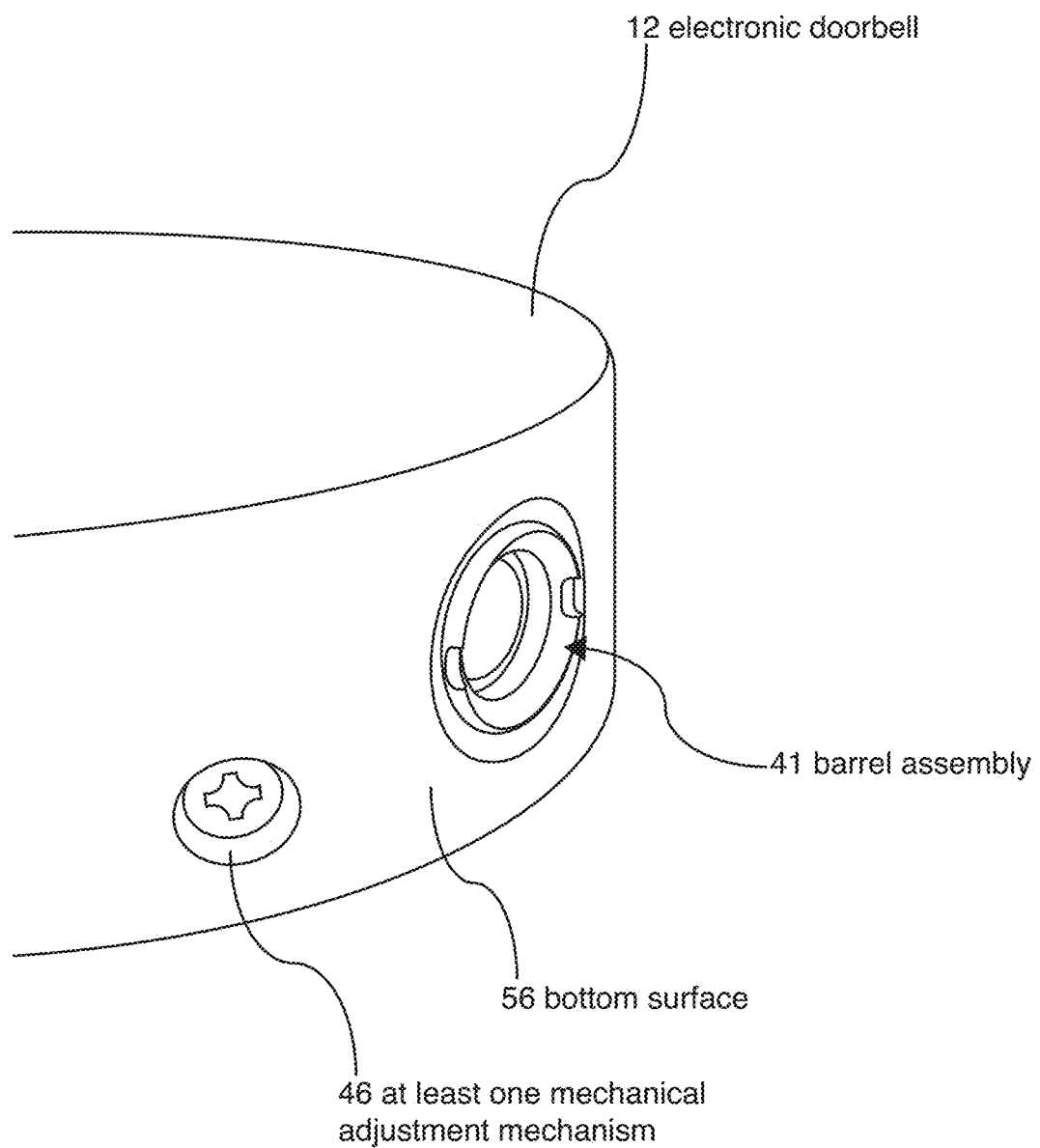
FIGS. 6A and 6B illustrate a bottom surface of the electronic doorbell showing the barrel assembly and how to remove the barrel assembly, according to some embodiments.
Figure 6B:
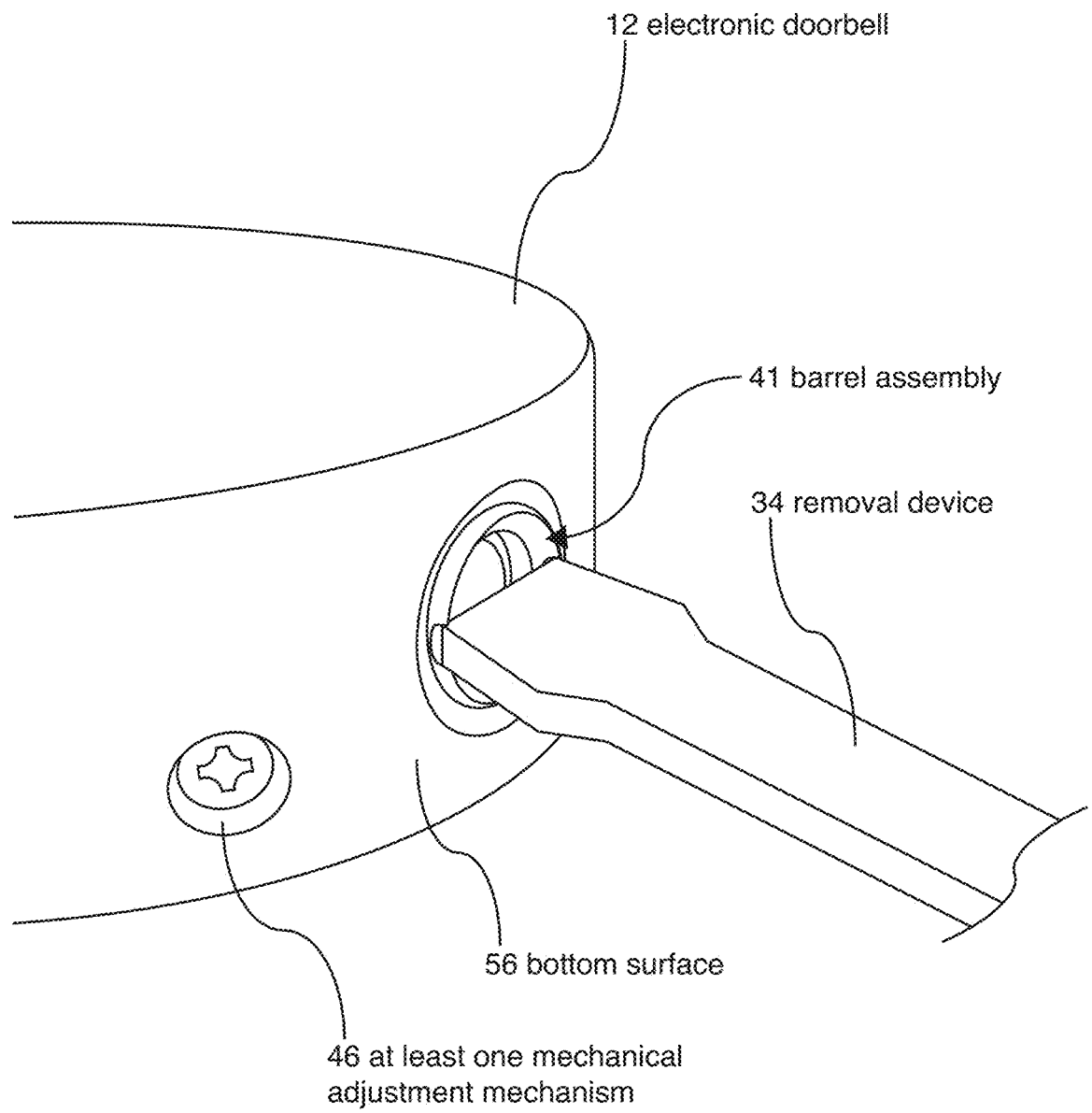

Now, with reference to FIG. 6a, the barrel assembly 41 is illustrated having indentations along an outward facing surface of the barrel assembly 41. As shown in FIG. 6b, the indentations are configured to receive a removal device 34, such as a screwdriver tip or even a coin, whereby rotation of the removal device 34 will allow the barrel assembly 41 to be removed from the housing.

Figure 7A:
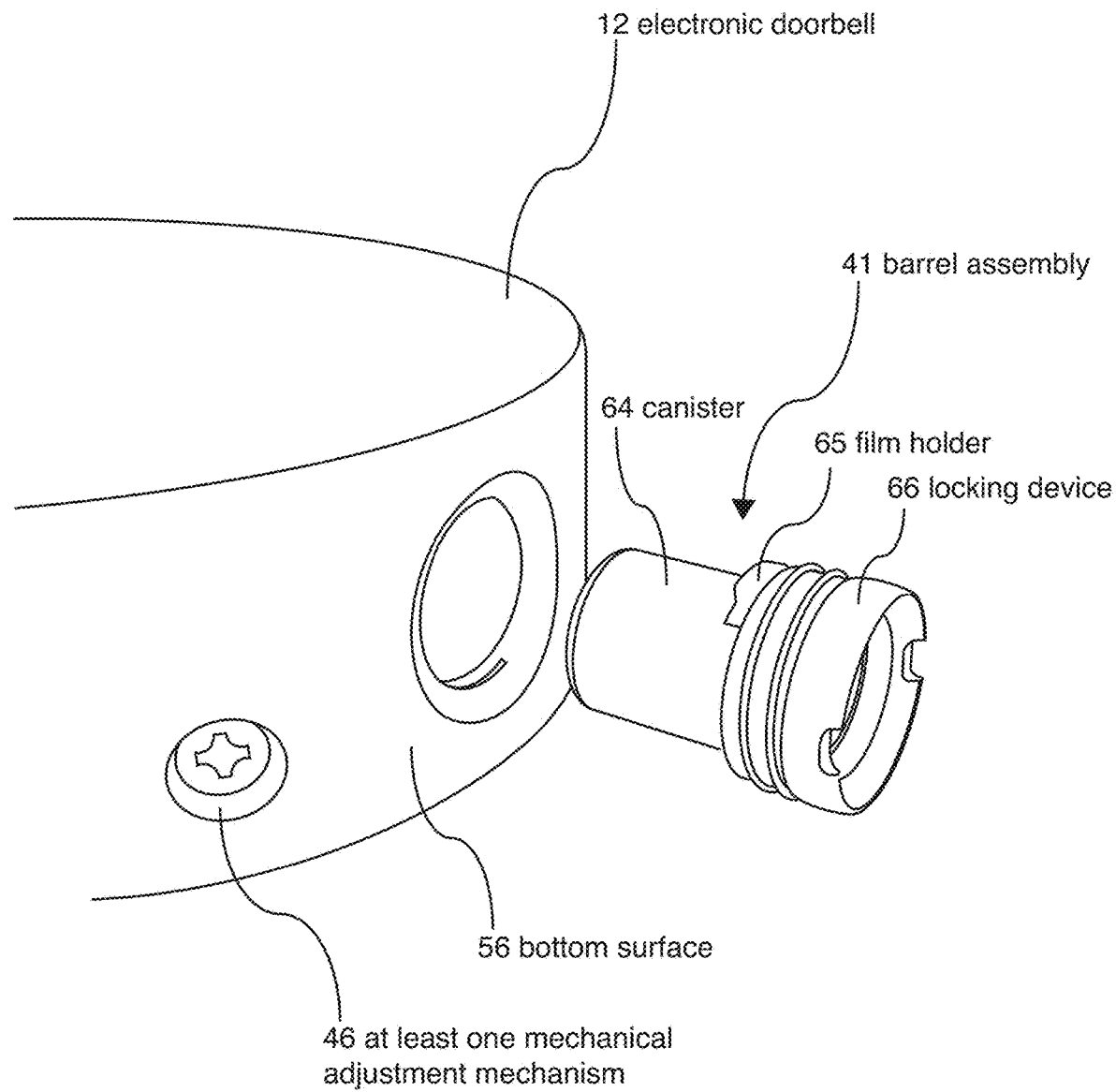
FIGS. 7A, 7B, and 7C illustrate a bottom surface of the electronic doorbell showing how to replace the barrel assembly and the film holder, according to some embodiments.

FIG. 7a shows that the barrel assembly 41 may be completely removed from the housing 44. As illustrated, the barrel assembly 41 may comprise a locking device 66 configured to both receive the removal device 34 and threadably couple to the housing 44. The barrel assembly 41 may also include a canister 64 having a protrusion configured to receive film holder 65. The film holder 65 includes a film that determines what illumination 26 is projected on the surface 28 via the light 24. In other words, when light 24 is illuminated, the light passes through the inside of the canister 64, through the film holder 65 and away from the outward facing portion of the barrel assembly 41 whereby the illumination 26 is projected onto the surface 28.

Figure 7B:
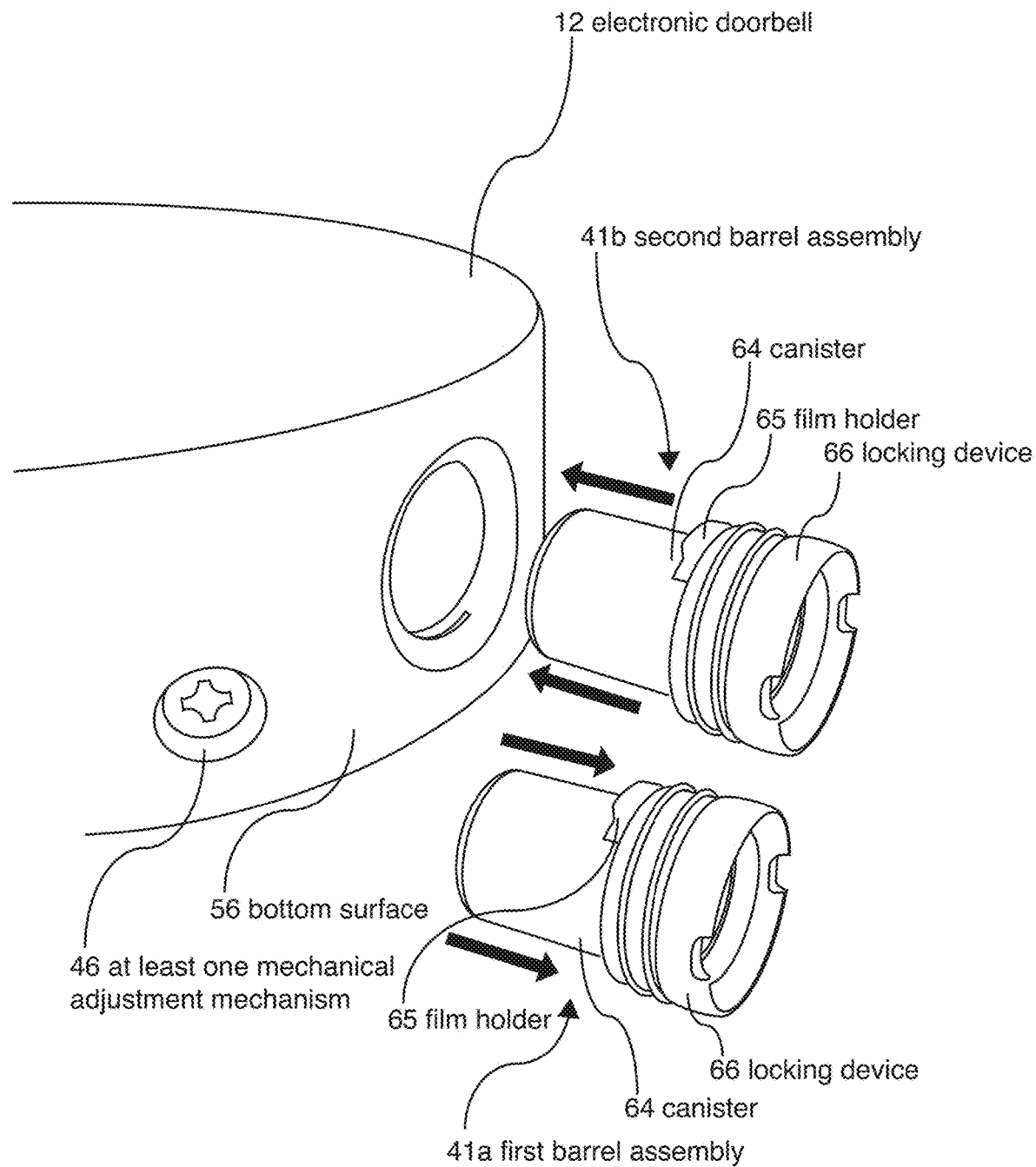

The doorbell 12 may be configured to project a variety of different illumination designs. As illustrated in FIG. 7b, the doorbell 12 may project different illumination designs by removing a first barrel assembly 41a and replacing it with a second barrel assembly 41b. The first barrel assembly 41a may include a first film having a first illumination design while the second barrel assembly 41b includes a second film having a second illumination design that is different from the first illumination design. In other words, if the doorbell 12 is currently projecting an illumination stating "Welcome to our home" (via a first barrel assembly 41a) and the user wishes to project a different message stating "Go Phillies!" (via a second barrel assembly 41b), the user would insert the removal device 34 into the first barrel assembly 41 and rotate the removal device a first rotational direction to thereby remove the first barrel assembly 41a from the housing 44, specifically from the aperture located on the bottom surface 56 of the housing 44. The user would then insert the second barrel assembly 41b into the aperture located on the bottom surface 56 of the housing 44, position the removal device 34 within the indentations of the second barrel assembly 41b, and rotate the removal device a second direction opposite the first direction to thereby fasten the second barrel assembly 41b to the housing 44.

Figure 7C:
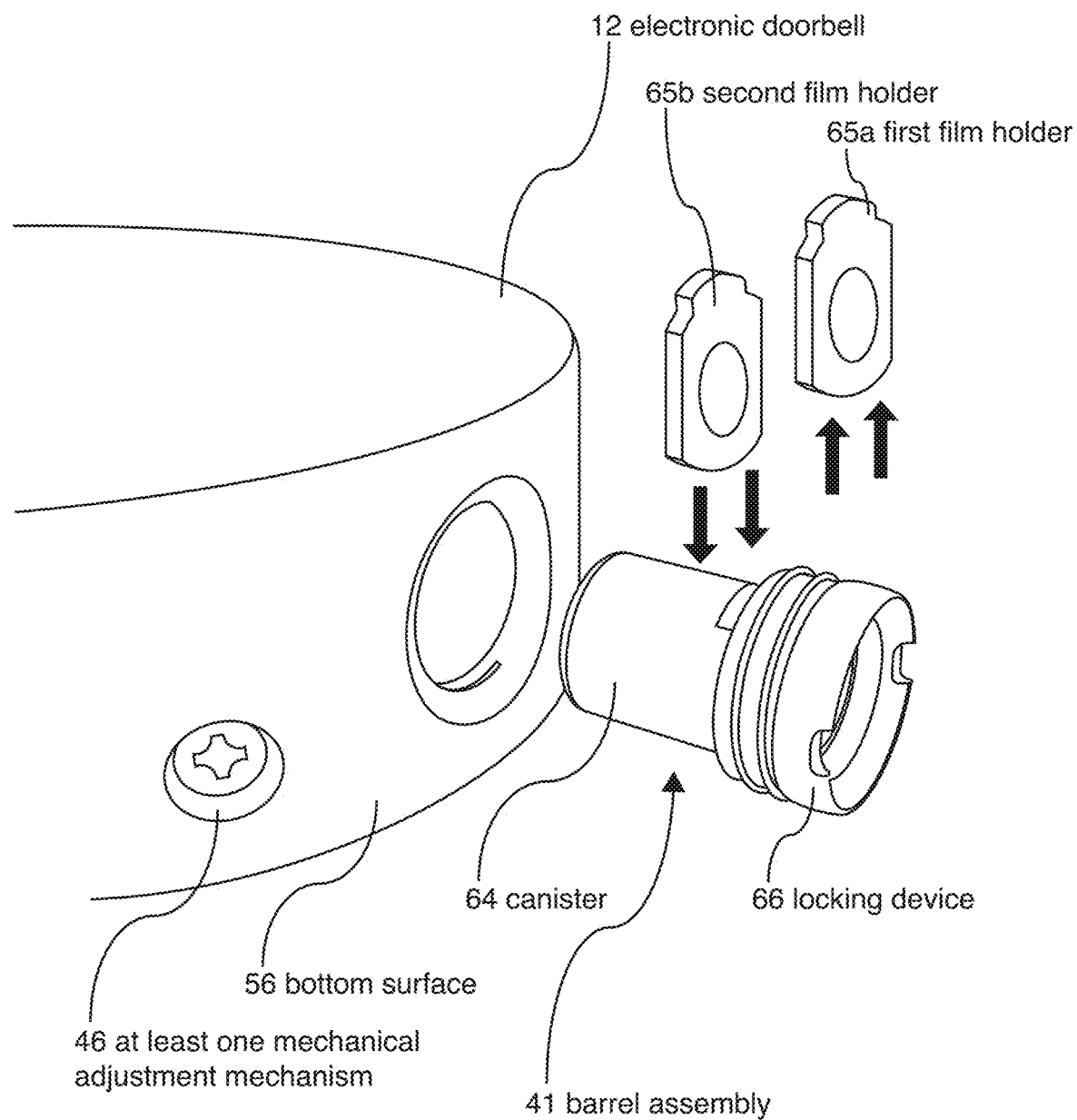

FIG. 7c illustrates yet another way of changing the illumination design being projected from the doorbell 12. As shown in FIG. 7c, rather than swapping entire barrel assemblies, a user may instead swap out film holders 65. More specifically, a first film holder 65a may include a first film having a first illumination design while a second film holder 65b includes a second film having a second illumination design that is different from the first illumination design. In other words, if the doorbell 12 is currently projecting an illumination stating "Home protected by Honeywell®" (via the first film holder 65a) and the user wishes to project a different message stating "Happy Birthday Talia!" (via the second film holder 65b), the user would insert the removal device 34 into the barrel assembly 41 and rotate the removal device a first rotational direction to thereby remove the barrel assembly 41 from the housing 44. The user would then slideably remove the first film holder 65a from the barrel assembly 41 and replace the first film holder 65a with the second film holder 65b. The user would thereby insert the barrel assembly 41 (having the second film holder 65b attached) into the aperture located on the bottom surface 56 of the housing 44, position the removal device 34 within the indentations of the barrel assembly 41, and rotate the removal device the second rotational direction to fasten the barrel assembly 41 to the housing 44.

It should be appreciated that the doorbell 12 may project any illumination 26 having any type of message, illustration, and the like. For example, some illuminations 26 may only include words, while others include only illustrations, while others include a combination of words and illustrations or designs. Generally, by giving users the ability to project custom messages from the barrel assembly 41, this allows a user to customize an area of their home or business and provide a message(s) or image(s) to visitors and/or passersby to draw attention, provide information, and the like.

Figure 8:
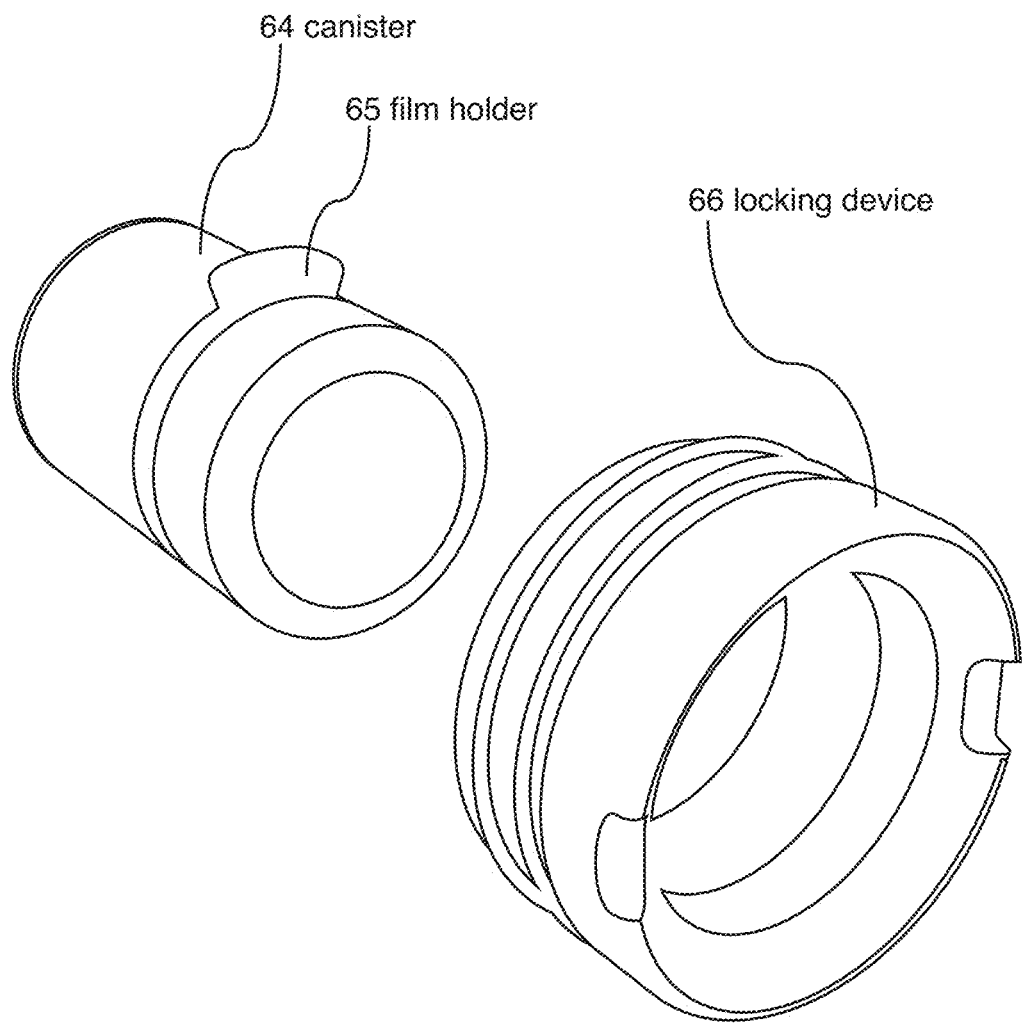
FIG. 8 illustrates an exploded view of the barrel assembly, according to some embodiments.

FIG. 8 illustrates a partially exploded view of the barrel assembly 41 with the locking device 66 decoupled from the canister 64. As shown, the barrel assembly 41 includes locking device 66 with an optional gasket to seal the inside of the housing 44 so moisture does not enter the housing 44. Additionally, the barrel assembly 41 may include canister 64 having an aperture configured to receive film holder 65. In some embodiments, the locking device 66 is a separate component from the canister 64 that attaches to the canister via a friction fit. In some embodiments, the locking device 66 is contiguous or one with the canister 64. In some embodiments, doorbell 12 includes a sealing gasket located between the light source and the barrel assembly 41 such most of, if not all of, the light from the light source is directed through the barrel assembly 41.

Figure 9:
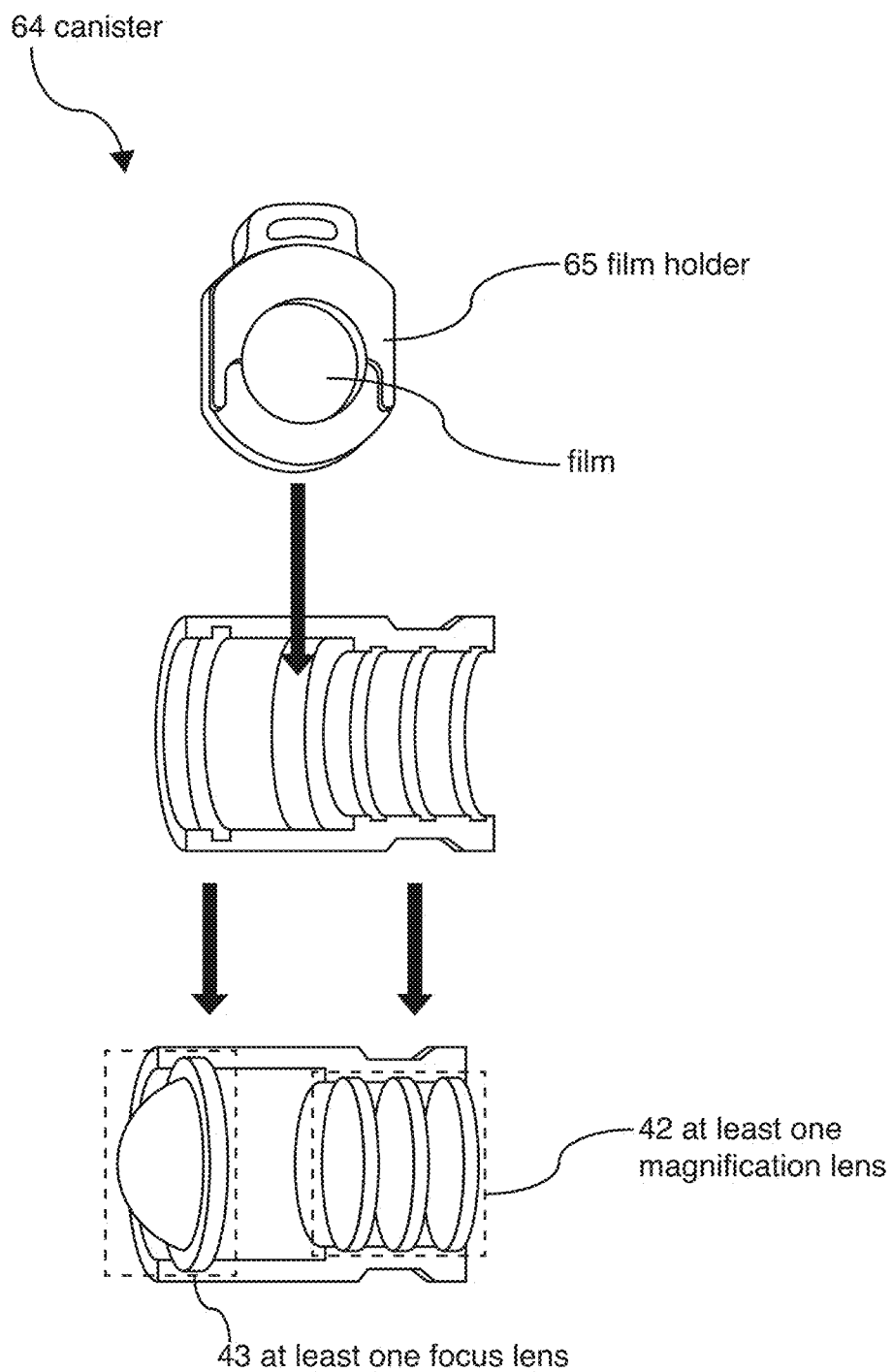
FIG. 9 illustrates a cutaway of the barrel assembly and its components, according to some embodiments.

FIG. 9 includes an exploded view of the barrel assembly 41 showing the internal components. As shown in FIG. 9, in some embodiments, the barrel assembly 41 includes at least one magnification lens 42 and at least one focus lens 43. When the barrel assembly 41 is coupled to the housing 44, the at least one magnification lens 42 may be located adjacent to the light 24. In this regard, light from the light 24 passes through the at least one magnification lens 42 whereby the light rays are magnified. As the magnified light rays then pass through the film located within film holder 65, the images on the film act like a series of multicolored filters. The filtered light, carrying the image on the film, then passes through the at least one focus lens 43 that spreads the light out and focuses it onto the surface 28. In some embodiments, the at least one magnification lens 42 comprises one magnification lens, two magnification lenses, three magnification lenses, four magnification lenses, five magnification lenses, six magnification lenses, seven magnification lenses, eight magnification lenses, nine magnification lenses, and ten or more magnification lenses. In some embodiments, the at least one focus lens 43 comprises one focus lens, two focus lenses, three focus lenses, four focus lenses, five focus lenses, six focus lenses, seven focus lenses, eight focus lenses, nine focus lenses, and ten or more focus lenses.

INTERPRETATION

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. An electronic doorbell system comprising:
an electronic doorbell including a housing;
a light source coupled to the housing;
a detection device, coupled to the housing; and
a canister coupled to a bottom surface of the housing adjacent the light source, wherein the canister comprises at least one lens coupled to a film holder, wherein the at least one lens is configured to allow light from the light source to pass through the at least one lens, the light source being operable to project an illumination onto a ground surface, in front of the electronic doorbell, in response to an event detected by the detection device.

2. The electronic doorbell system of claim 1, further comprising a light filter coupled to the light source.

3. The electronic doorbell system of claim 1, wherein the at least one lens includes at least one magnification lens being configured to magnify the light from the light source.

4. The electronic doorbell system of claim 3, wherein the at least one magnification lens comprises a first magnification lens, a second magnification lens, and a third magnification lens.

5. The electronic doorbell system of claim 3, wherein the at least one lens is configured to spread the light and focus the illumination onto the ground surface.

6. The electronic doorbell system of claim 1, wherein the light source is configured to constantly project the illumination.

7. The electronic doorbell system of claim 1, wherein the light source is configured to project the illumination in response to a press of a user-activated button coupled to the housing.

8. The electronic doorbell system of claim 1, wherein the light source is configured to project the illumination in response to an indication of a presence of a visitor by a camera coupled to the housing.

9. The electronic doorbell system of claim 1, wherein the light source is configured to project the illumination in response to a detection of a sound by a microphone coupled to the housing.

10. The electronic doorbell system of claim 1, wherein the light source is configured to project the illumination in response to a detection of motion by a motion detector coupled to the housing.

11. The electronic doorbell system of claim 1, further comprising a remote computing device communicatively coupled to the electronic doorbell, wherein the remote computing device is configured to run a mobile application, wherein the electronic doorbell is configured to project the illumination in response to an input on the mobile application.

12. The electronic doorbell system of claim 1, wherein the canister is detachably coupled to the housing.

13. The electronic doorbell system of claim 1, further comprising at least one mechanical adjustment mechanism threadably coupled to the housing, wherein the at least one lens is adjustable in a first direction in response to rotating the at least one mechanical adjustment mechanism in a first rotational direction and the at least one lens is adjustable in a second direction in response to rotating the at least one mechanical adjustment mechanism in a second rotational direction that is opposite the first rotational direction.

14. A method of projecting an illumination by an electronic doorbell comprising at least one lens coupled to a film holder including at least two illumination designs, a detection device coupled to the electronic doorbell, and a light communicatively coupled to at least one of the electronic doorbell and the detection device, wherein the light is configured to pass through the at least one lens and project the illumination through the at least one lens onto a ground surface, the method comprising:
detachably coupling the at least one lens from the electronic doorbell;
receiving, by the electronic doorbell, a notification of a trigger event; and
in response to the receiving, projecting, by the light, the illumination onto the ground surface, wherein the projecting comprises emitting, by the light, the illumination through the at least one lens and onto the ground surface, such that a design of the illumination is determined by the at least one lens.

15. The method of claim 14, wherein the trigger event comprises a press of a button coupled to the electronic doorbell.

16. The method of claim 14, further comprising threadably coupling at least one mechanical adjustment mechanism to a housing of the electronic doorbell.

17. The method of claim 16, further comprising:
rotating the at least one mechanical adjustment mechanism in a first rotational direction; and
in response to the rotating, adjusting the at least one lens coupled to the housing of the electronic doorbell.

18. The method of claim 14, wherein the trigger event comprises at least one of powering on the electronic doorbell and providing power to the electronic doorbell.

19. The method of claim 14, wherein the trigger event comprises a motion detected by a motion detector coupled to the electronic doorbell.

20. The method of claim 14, wherein the trigger event comprises at least one of an indication of motion recorded by a camera and a sound detected by a microphone, wherein the camera and the microphone are coupled to the electronic doorbell.

* * * * *